United States Patent
Rupp

(10) Patent No.: US 8,517,281 B2
(45) Date of Patent: Aug. 27, 2013

(54) CIRCULAR BAR-CODE, DRUG CONTAINER, ELEMENT CARRYING A CIRCULAR BAR-CODE AND SYSTEM OF CIRCULAR BAR-CODES

(75) Inventor: Paul Rupp, Frankfurt am Main (DE)

(73) Assignee: Sanofi-Aventis Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 13/380,771

(22) PCT Filed: Jun. 28, 2010

(86) PCT No.: PCT/EP2010/059125
§ 371 (c)(1),
(2), (4) Date: Mar. 1, 2012

(87) PCT Pub. No.: WO2011/000798
PCT Pub. Date: Jan. 6, 2011

(65) Prior Publication Data
US 2012/0153031 A1    Jun. 21, 2012

(30) Foreign Application Priority Data
Jun. 30, 2009 (EP) .................................... 09008498

(51) Int. Cl.
*G06K 19/06* (2006.01)

(52) U.S. Cl.
USPC .......................................... 235/494; 235/375

(58) Field of Classification Search
USPC .............................. 235/494, 462.03, 454, 375
See application file for complete search history.

(56) References Cited

U.S. PATENT DOCUMENTS

| | | | |
|---|---|---|---|
| 5,395,181 A | 3/1995 | Dezse et al. | |
| 5,700,998 A * | 12/1997 | Palti | 235/375 |
| 5,808,284 A | 9/1998 | Domanik | |
| 5,861,613 A | 1/1999 | Apelberg et al. | |
| 6,110,152 A | 8/2000 | Kovelman | |
| 6,527,181 B1 | 3/2003 | Kleeberg et al. | |
| 2003/0121979 A1 | 7/2003 | D'Haens et al. | |

FOREIGN PATENT DOCUMENTS

| | | |
|---|---|---|
| DE | 102004033365 | 2/2006 |
| EP | 706146 A2 * | 4/1996 |
| JP | 07-175900 | 7/1995 |

(Continued)

OTHER PUBLICATIONS

European Search Report for European Patent App. No. 09008498, dated Feb. 9, 2010.

(Continued)

*Primary Examiner* — Edwyn Labaze
(74) *Attorney, Agent, or Firm* — McDonnell Boehnen Hulbert & Berghoff LLP

(57) ABSTRACT

A circular bar-code for encoding information regarding at least one of a body or a content of a body is provided. The bar-code encircles a central point and is configured such that the information encoded by the bar-code is readable along a closed line encircling the central point. The circular bar-code may be used for encoding a drug container, wherein the bar-code is located at the front face of the drug container such that the information encoded by the bar-code is readable from a front view to the drug container. The circular bar-code may be applied to an element configured to be attached to the front end of the drug container.

13 Claims, 2 Drawing Sheets

(56) References Cited

FOREIGN PATENT DOCUMENTS

| WO | 01/84542 | 11/2001 |
| WO | 2005/032449 | 4/2005 |
| WO | 2005/106769 | 11/2005 |
| WO | 2006/084464 | 8/2006 |
| WO | 2006/123252 | 11/2006 |
| WO | 2010/036609 | 4/2010 |

OTHER PUBLICATIONS

Partial European Search Report for European Patent App. No. 09008498, completed Feb. 2, 2010.

International Search Report for International App. No. PCT/EP2010/059125, completed Jul. 29, 2010.

International Preliminary Report on Patentability for for International App. No. PCT/EP2010/059125, completed Sep. 28, 2011.

* cited by examiner

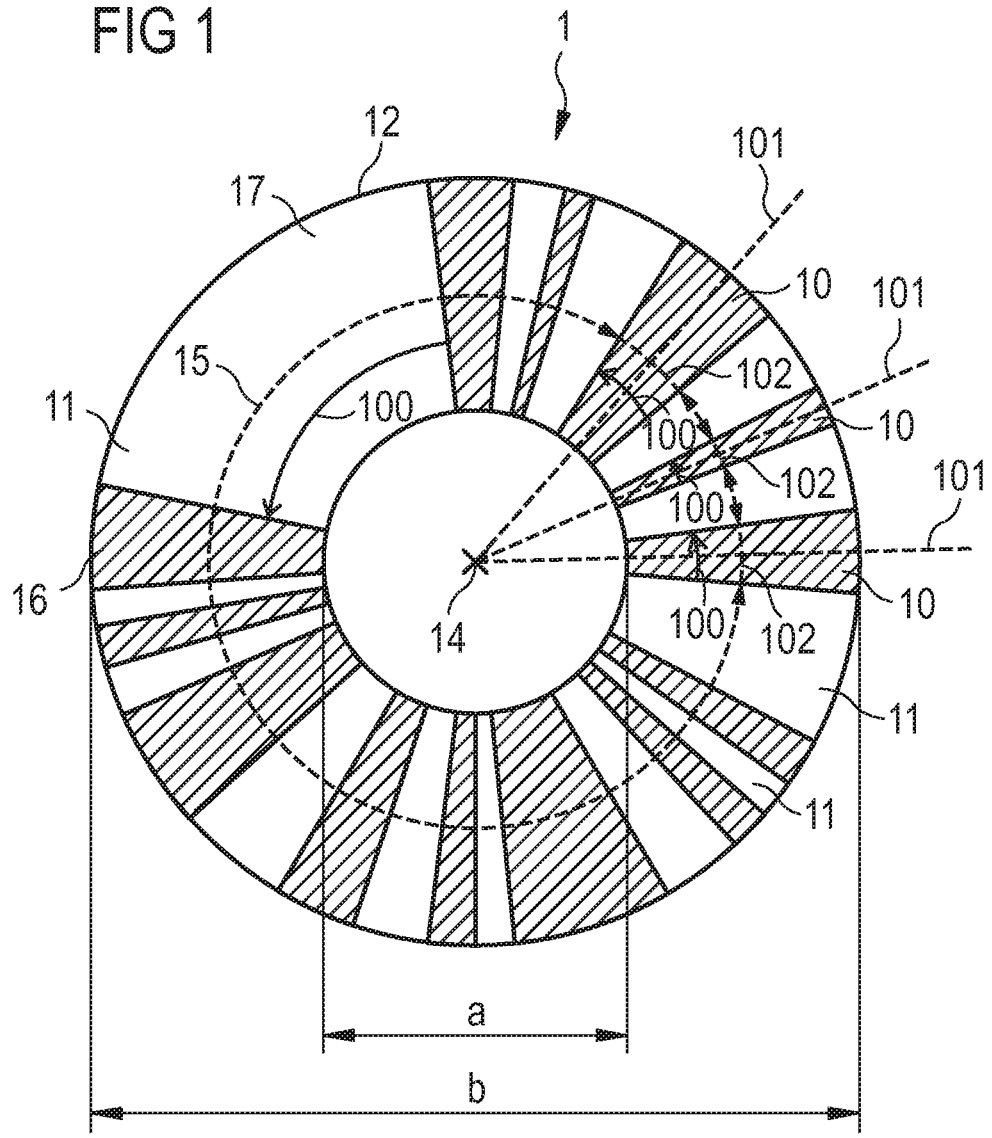

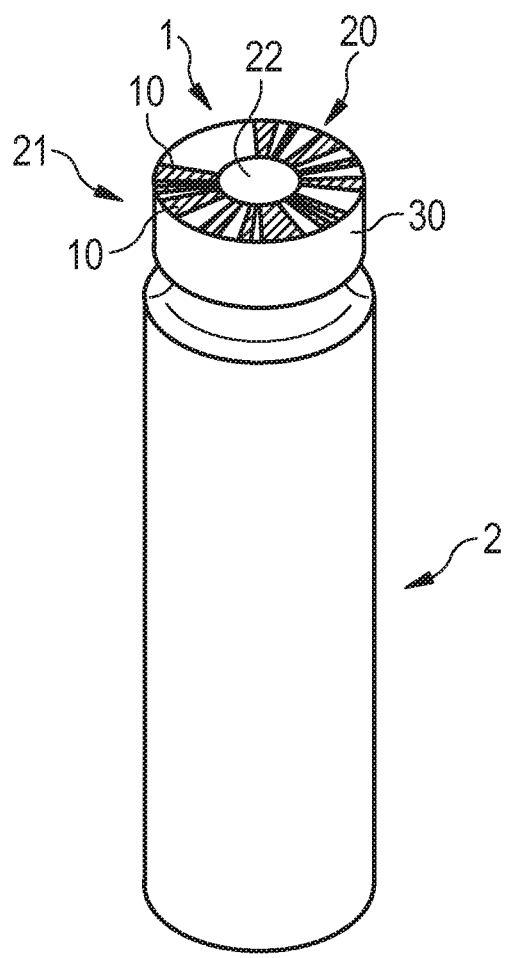

CIRCULAR BAR-CODE, DRUG CONTAINER, ELEMENT CARRYING A CIRCULAR BAR-CODE AND SYSTEM OF CIRCULAR BAR-CODES

CROSS REFERENCE TO RELATED APPLICATIONS

The present application is a U.S. National Phase Application pursuant to 35 U.S.C. §371 of International Application No. PCT/EP2010/059125 filed Jun. 28, 2010, which claims priority to European Patent Application No. 09008498.9 filed on Jun. 30, 2009. The entire disclosure contents of these applications are herewith incorporated by reference into the present application.

FIELD OF INVENTION

This disclosure relates to a bar-code for encoding information related to a body or the content of a body. Such a bar-code may be used for encoding drug containers for drug delivery devices, e.g. cartridges containing a liquid medicament.

BACKGROUND

The international patent applications WO 2005/032449 A1, WO 01/84542 A2 and WO 2006/084464 A1 disclose methods of encoding medical cartridges, for example by applying a bar-code to the side face of the cartridge. The U.S. Pat. No. 6,110,152 discloses a cartridge for use with an electronic delivery device, wherein information is provided at the cartridge housing. The international patent application WO 2006/123252 A1 discloses a method of marking a batch of containers by providing an intrinsic and extrinsic identification code on each container.

SUMMARY

It is the aim of the present invention to provide a bar-code, wherein the information provided by the bar-code is reliably and easily readable from the bar-code.

According to a first aspect of the present invention, a circular bar-code for encoding information regarding at least one of a body or a content of a body is provided. The bar-code encircles a central point and is configured such that the information encoded by the bar-code is readable or analyzable along a closed line encircling the central point.

Preferably, the full information encoded by the bar-code can be gathered by reading the bar-code along the closed line. Here, the full information may be read along each of a plurality of closed lines.

Preferably, the bar-code comprises dark and bright areas, wherein the information is encoded by the distribution of the dark and the bright areas. As examples, the bar-code may be colored in black and white or may comprise different colors.

The information of the bar-code may be read by an optical reading device, e. g. an optical scanner, which uses the different reflection of light at the dark and bright areas of the bar-code. For reading the bar-code, the optical reading device may emit a light beam and measure the intensity of the light reflected from the bar-code. In particular, the information may be read sequentially by moving a light beam along the closed line, thus scanning the bar-code.

In a preferred embodiment, the bar-code is configured such that the information is readable from a fixed position of a reading device relative to the bar-code.

Here, preferably, the bar-code is readable by an optical scanner emitting a light beam from a fixed source relative to the bar-code. In this case, the bar-code has to be located on the body such that the entire closed line is accessible from the fixed source of the light beam. As an example, the bar-code may be provided at a planar surface of the body and may be read from a top view to the surface.

In one embodiment, the central point of the bar-code is located within the bar-code. As an example, the central point may be covered by a dark area. In a second embodiment, the bar-code encircles the central point such that the bar-code does not cover the central point.

In a preferred embodiment, the circular bar-code is configured such that the information encoded by the bar-code is readable along a circular line encircling the central point.

In further embodiments, the shape of the closed line may be elliptical or rectangular. Preferably, the shape of the closed line is adapted to the contour of the body comprising the bar-code.

The bar-code may be particularly useful for encoding information regarding a cylindrical body or the content of a cylindrical body and being applied to the cylindrical body. Such a cylindrical body may have a curved lateral face and two front faces. Preferably, the bar-code is applied to a front face of the cylindrical body. In this case, the bar-code can be easily read when the body is oriented with its front face pointing upwards.

As an example, the body may serve as a container for holding a liquid. In particular, the body may be a tin or a drug container, e. g. a vial or a cartridge. When the bar-code is applied to the front face of the container, the information is readable while the container is located in an upright position, for example in a filling line or during assembly of an application device comprising the filled container.

In a preferred embodiment, the shape of the bar-code is adapted to the shape of the face of the body such that the bar-code is readable along a closed line running near the outer perimeter of the face. Thereby, the length of the closed line for reading the bar-code can be maximized. Thereby, for a given number of dark and bright areas encoding the information along the closed line, also the possible widths of the dark and bright areas along the closed line can be maximized. As a result, the reliability of the correct reading of the bar-code can be increased. As an example, for a bar-code applied to a circular face of a body, the bar-code may cover the circular perimeter or a circular line running near the circular perimeter. Thereby, the bar-code is readable along this circular line having a maximum length.

In one embodiment, the bar-code is contained in a circular disk.

Here, preferably, the bar-code fills the circular disk such that information encoded by the bar-code is readable along every closed line encircling the central point. In particular, the bar-code is readable along every circular line having the central point as its center point. Thereby, the flexibility of the reading process is increased, as the bar-code is readable along a plurality of lines.

A bar-code contained in a circular disk may be particularly useful for a bar-code applied to a circular face of a body. Preferably, the dimensions of the circular disk match the dimensions of the circular face. In this case, the bar-code is readable along a circular line near the outer perimeter of the circular face. When the bar-code fully covers the circular disk, the bar-code is also readable along a circular line having a smaller radius, wherein the flexibility of the reading process can be enhanced.

In a further embodiment, the bar-code is contained in a circular ring.

A bar-code contained in a circular disk ring may be particularly useful for a bar-code applied to a face of a body, wherein the face has a circular perimeter and a circular, central opening. Preferably, the dimensions of the circular disk match the dimensions of the face such that the bar-code covers the circular face and leaves open the central opening.

The circular ring has an inner diameter and an outer diameter. Preferably, the bar-code covers the circular ring such that information encoded by the bar-code is readable along every closed line encircling the central point and running within the circular ring. In particular, the bar-code is readable along every circular line running within the circular ring and having the central point as its center point.

Thus, the flexibility of the reading process is increased, as the bar-code is readable along a plurality of lines. In particular, the flexibility is increased regarding the design of the reading device. As an example, by using one specific reading device configured to read a bar-code along a specific line, the reading device can be used for reading bar-codes having different dimensions and shapes.

Furthermore, the flexibility is increased regarding the relative positioning of the reading device and the bar-code. As the bar-code is readable from a plurality of lines, and, preferably, adjacent lines, the correct reading of the bar-code is insensitive to small relative displacements of the reading device and the bar-code. Thus, in the positioning of the reading device relative to the bar-code it suffices to ensure that always a closed line encircling the central point and running within the bar-code can be sampled by the reading device.

In further embodiments, the bar-code may be contained in an area having a shape different from a circular disk or a circular ring. Preferably, for a bar-code applied to a specific face of a specific body, the dimensions of the bar-code match the dimensions of the specific face.

In a preferred embodiment, the bar-code comprises a plurality of bars running in a radial direction.

Each bar may have the shape of a circular sector. Preferably, each bar has a color contrasting with the color of the spacings between the bars. As an example, the bars have a uniform dark color, e. g. black. In this case, the spacings between the bars may have a bright color, e. g. white.

Preferably, the information is encoded by the angular positions of the bars and the sizes of the angular ranges covered by the bars. The angular position of a bar can be defined as the angular position of a central axis of the bar running in a radial direction.

The bar-code may comprise a reference mark providing a point of reference for the angular positions of the bars.

Thereby, the angular position of a bar with respect to the reference mark can be determined. In particular, the reference mark defines a start point and an end point of the bar-code. As an example, the reference mark may be realized as a predetermined segment of the bar-code, wherein bars having predetermined angular positions from each other are provided. The predetermined segment of the bar-code provides a zero point for the angular positions. In further embodiments, the reference mark may be realized by a bar or an area having a different color, shape or angular range than the bars carrying the information. As an example, the reference mark may be provided by a spacing having a larger angular range than the other spacings.

Furthermore, a drug container comprising a circular bar-code is provided. The drug container has a front face at which the bar-code is located. The information encoded by the bar-code is readable from a front view to the drug container.

As an example, the drug container may have a mainly cylindrical shape comprising a curved side face and planar front and bottom faces. Preferably, when filling the drug container in a filling line, the drug container is positioned in an upright position such that the front face points upwards. In this position, the bar-code can easily be applied to the front face of the drug container. Furthermore, from a bar-code applied to the front face, the information encoded by the bar-code can be easily read from a top view to the drug container. For applying and reading the bar-code, neither a reorientation of the drug container nor a reorientation of a labeling or reading device is necessary. Accordingly, the bar-code can be easily applied to the drug container and read from the drug container.

Preferably, the drug container has an access area to its inner volume at a central part of the front face.

In particular, the drug container may be a cartridge having a cylindrical main body. At its top face, the cartridge is sealed by a membrane secured to the cartridge by a metal cover. In a central area of the front face, the metal cover has an opening, whereby an access area for accessing the medicament is provided. The medicament contained in the cartridge can be accessed through a needle piercing the membrane.

The bar-code may be located at the front face of the metal cover. Preferably, the bar-code encircles the access area.

By a circular bar-code covering a large part of the front face, a reliable reading of the bars can be achieved. A circular bar-code contained in a circular ring is particularly useful for applying it to the front face of a drug container having a circular perimeter and a central, circular access area. Preferably, the dimensions and shape of the bar-code are adapted to the dimensions and shape of the front face.

As an example, the bar-code encodes information regarding the specific medicament contained in the drug container, for example a liquid medicament. This may be a specific insulin type or a specific mixture of insulin types.

Furthermore, an element carrying a circular bar-code is provided. In a preferred embodiment, the element is configured to be attached to the front end of a drug container.

In this embodiment, the bar-code is not directly applied to the housing of the drug container, but to a separate element attached to the housing. Thereby, the risk of contaminating the drug container or the content of the drug container is reduced. The bar-code may be applied to the element before the element is attached to the housing of the drug container or after the element is attached to the housing.

As an example, the element may be a cap which is configured to fit over the front end of the drug container.

In particular, the cap may be a metal cap, configured to secure a membrane at the front end of the drug container.

In a further embodiment, the element may be a label which is configured to be adhered to the front face of the drug container. The label may be directly applied to the front face of the housing of the drug container or may be applied to a metal cover attached to the front end of the housing of the drug container.

Furthermore, a system of bar-codes is provided, wherein each bar-code is configured to identify a drug container or the content of a drug container within a plurality of drug containers.

As an example, a system of bar-codes may comprise a plurality of bar-codes having equal shapes and dimensions. Each bar-code may be contained in a circular ring. Information may be encoded by bars running in a radial direction, wherein each bar is located at a specific position within the circular ring and covers a specific angular range of the circular ring. The bar-codes differ in the angular positions and angular ranges of bars. Thereby, each bar-code may encode information relating to a specific drug container or a drug contained in the drug container. As an example, each bar-code may encode a specific liquid drug, e. g. a specific type of insulin or a specific composition of insulin types contained in a drug container. By providing a bar-code at each drug-container, the drug contained in the drug-container can be easily identified.

In the following text, a set of particularly advantageous aspects is provided by making use of numbers to facilitate making references to the respective aspects.

1. A circular bar-code for encoding information regarding at least one of a body or a content of a body,
wherein the bar-code encircles a central point and wherein the bar-code is configured such that the information encoded by the bar-code is readable along a closed line encircling the central point.

2. The circular bar-code according to aspect 1, wherein the bar-code is configured such that the information encoded by the bar-code is readable along a circular line encircling the central point.

3. The circular bar-code according to any of aspects 1 or 2, wherein the bar-code is contained in a circular disc.

4. The circular bar-code according to any of aspects 1 or 2, wherein the bar-code is contained in a circular ring.

5. The circular bar-code according to aspect 4, wherein the bar-code is configured such that the information encoded by the bar-code is readable along every closed line which both runs within the circular ring and encircles the central point.

6. The circular bar-code according to any of aspects 1 to 5, wherein the bar-code comprises a plurality of bars running in a radial direction.

7. The circular bar-code according to any of aspects 1 to 6, wherein the information is encoded by the angular positions of the bars and the sizes of the angular ranges covered by the bars.

8. The circular bar-code according to any of aspects 1 to 7, comprising a reference mark which provides a point of reference for the angular positions of the bars.

9. A drug container comprising a circular bar-code according to any of aspects 1 to 8, wherein the drug container has a front face and wherein the bar-code is located at the front face of the drug container such that the information encoded by the bar-code is readable from a front view to the drug container.

10. The drug container according to aspect 9, having an access area to its inner volume at a central part of the front face.

11. The drug container according to aspect 10, wherein the bar-code encircles the access area.

12. The drug container according to any of aspects 9 to 11, wherein the drug container is a cartridge mountable in an injection device.

13. The drug container according to any of aspects 9 to 12 containing insulin, wherein the bar-code encodes the specific insulin type or the specific composition of insulin types.

14. An element carrying a circular bar-code according to any of aspects 1 to 8, wherein the element is configured to be attached to the front end of a drug container for encoding at least one of the drug container and the content of the drug container.

15. The element according to aspect 14, wherein the element is a cap which is configured to be fitted over a front end of the drug container.

16. The element according to aspect 14, wherein the element is a label which is configured to be adhered to the front face of the drug container.

17. A system of circular bar-codes according to any of aspects 1 to 8, wherein each bar-code is configured to identify a drug container or the content of a drug container within a plurality of drug containers.

Other features will become apparent from the following detailed description when considered in conjunction with the accompanying drawings.

BRIEF DESCRIPTION OF THE FIGURES

FIG. 1 is a top view at a bar-code contained in a circular ring,

FIG. 2 is a view of a drug container comprising a circular bar-code at its front face.

DETAILED DESCRIPTION

FIG. 1 is a top view at a circular bar-code 1 contained in a circular ring 16 encircling a central point 14 and having an inner diameter a and an outer diameter b. The bar-code 1 fills the circular ring 16 such that each circular line 15 runs through dark areas and bright areas of the bar-code 1. The circular bar-code 1 does not extend beyond the circular ring 16.

The bar-code 1 comprises bars 10 running in the radial direction from the inner diameter a to the outer diameter b of the circular ring 16. The bars 10 have a spacing 11 between each other. The color of the bars 10 contrasts with the color of the spacings 11 between the bars 10. As an example, the bars 10 may have a black color and the spacings 11 may have a white color.

Each bar 10 is located at a specific angular position 101 and covers a specific angular range 100. The information encoded by the bar-code 1 is contained in the angular positions 101 and sizes of the angular ranges 100 of the bars 10. The angular position 101 of a bar 10 is determined by the angular position 101 of a central axis of a bar 10 running in a radial direction. The sizes of the angular ranges 100 of the bars 10 may be limited to a certain number of sizes such that a well-defined mapping between a certain piece of information and a certain size of an angular range can be achieved. Similarly, the angular positions 101 of the bars 10 may be limited to a certain number of angular positions. By combining various angular positions 101 and sizes of angular ranges 100 of bars 10 a system of bar-codes 1, comprising a limited number of different bar-codes 10, can be provided.

For determining an angular position 101 of the bars 10, the bar-code 1 comprises a reference mark 17. The reference mark 17 is provided by a spacing 11, wherein the size of the angular range 100 of the reference mark 17 is two to three times larger than the largest size of the angular ranges 100 of the other spacings 11. Thereby, a distinct reference mark 17 is provided, which clearly differs from the other spacings 11. In order to increase the reliability of the read-out of the information, the bar-code 1 may comprise a check sum. The check sum can be generated such that the reliability of a correct reading of the bar-code 1 is near to 100%.

The bar-code 1 is readable along every closed line encircling the central point 14 within the circular ring 16. Here, a circular line 15 within the bar-code 1 is depicted. By scanning the bar-code 1 along the circular line 15, the information contained in the bars 10 and the spacings 11 between the bars 10 can be gathered. Along the circular line 15, each bar 10 has a certain width 102. The widths 102 of the bars 10 increase with increasing distance from the central point 14. By reading the bar-code 1 along the outer perimeter 12 of the circular ring 16, or a line near the outer perimeter 12, the reliability of the reading process can be optimized, as the widths 12 of the bars 10 are at a maximum.

The depicted bar-code 1 is particularly useful for encoding a front face of a body, wherein the dimensions of the bar-code 1 match the dimensions of the front face.

FIG. 2 shows a drug container 2 comprising a bar-code 1 according to FIG. 1. The bar-code 1 is located at the front face 20 of the drug container 2. The bar-code 1 is applied to a metal cap 30 attached to the front end 21 of the drug container 2. The metal cap 30 secures a membrane (not shown here) sealing an opening of the drug container 2. The metal cap 30 has a central opening, whereby an access area 22 for accessing the liquid drug contained in the drug container 2 is provided. An end of the drug container 2 which is remote from the front face 20 may be sealed by a bung which is movably retained in the container (not explicitly shown). Movement of the bung towards the front face 20 will cause medicament contained in the drug container 2 to be ejected from the drug container provided that the medicament can leave the container, e.g. via the access area 22. For this purpose, the membrane may be pierced by a needle unit in the access area 22, thus providing fluid communication between the interior of the drug container 2 and the exterior of the drug container (not explicitly shown).

The shape and dimensions of the bar-code 1 are adapted to the shape and dimensions of the front face 20 of the drug container 2. Here, the bar-code 1 is contained in a circular ring 16 having an inner diameter a of about 3 mm and an outer diameter b of about 7.5 mm. In other embodiments, the outer diameter b of the front face 20 of a drug container 2 having a bar-code 1 may be in the size of 5 to 25 mm, preferably in the size of 7 to 15 mm. The disclosed bar-code 1 may be particularly useful for being applied to the front face 20 of a drug container 2 having a small surface area. Here, the information density of the bar-code 1 may have an optimum, when the proportion of the smallest readable width 102 of bars 10 along a circular line 15 within the circular ring 16 and the radial extension of the circular ring 16 is in the range of 1:1 to 1:4.

As examples, the bars 10 of the bar-code 1 may be applied to the front face 20 by a pad printing process or by a laser printing process. The bars 10 can be printed to the metal cap 30 before or after the metal cap 30 is attached to the drug container 2. The metal cap 30 may comprise aluminum.

The bar-code 1 is readable from a view to the top face 20 of the drug container 2. Thus, when the drug container 2 is positioned in an upright orientation such that the front face 20 points upwards, the bar-code 1 can be attached by an attachment device or read by an optical reading device positioned above the drug container 2. As an example, the drug container 2 may be positioned in a filling line for filling it with a liquid medicament. The metal cap 30 may be attached to the drug container 2 and the bar-code 1 may be applied to the metal cap 30 by automated processes. An optical reading device may be located at a fixed position above the filling line. For reading the information encoded by the bar-code 1, neither the drug container 2 nor the optical reader has to be rotated. The bar-code 1 expediently contains information about the medicament, e.g. the name(s) of its active compound(s) or its trade name, and/or about the drug container 2, e.g. about the volume of the container. The bar-code 1 may encode the specific insulin type, e.g. fast acting insulin or slow acting insulin or a mix ratio of fast acting and slow acting insulin, or the specific composition of insulin types held in the container. A system of different bar-codes 1 may be provided with each bar-code of the system being configured to, preferably unambiguously, identify a particular drug container 2 or the contents of a particular drug container within a plurality of drug containers.

A drug delivery device (not explicitly shown) expediently contains a drug container 2 which is provided with the bar-code 1 as described above. The bar-code 1 may still be viewable from outside of the device when the drug container 2 is assembled in the device. The drug delivery device may be an injection device. The drug delivery device may be a pen-type device, preferably a pen-type injector. The drug delivery device may be a reusable device, which preferably can be equipped with containers containing different medicaments. Information about the medicament currently used in the device can be gathered from the visible bar-code 1 in the assembled device without the need to disassemble the container from the remaining device components like, for example, the drive mechanism which may, when actuated, be adapted to urge medicament from the container.

The term "medicament", as used herein, preferably means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exedin-3 or exedin-4 or an analogue or derivative of exedin-3 or exedin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des(B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-Y-glutamyl)-des(B30) human insulin; B29-N-(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp- Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:
H-(Lys)4-des Pro36, des Pro37 Exendin-4(1-39)-NH2,
H-(Lys)5-des Pro36, des Pro37 Exendin-4(1-39)-NH2,
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39),
wherein the group -Lys6-NH2 may be bound to the C-terminus of the Exendin-4 derivative;
or an Exendin-4 derivative of the sequence
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2)25, Asp28] Exendin-4(1-39)-(Lys)6-NH2;
or a pharmaceutically acceptable salt or solvate of any one of the afore-mentioned Exedin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

The invention claimed is:
1. A drug container comprising
a cartridge containing a medicament in an inner volume, where the cartridge,
   a) is configured for use in a drug delivery device;
   b) has a front face with a central part providing an access area to the inner volume;
   c) a circular bar-code located on the front face for encoding information regarding the drug container or the medicament in the cartridge,
wherein the bar-code is configured to
   a) encircle a central point;
   b) allow the information encoded by the bar-code to be read along a closed line encircling the central point; and
   c) be read from a front view of the cartridge.
2. The drug container according to claim 1, wherein the bar-code encircles the access area.

3. The drug container according to claim 1, containing insulin, wherein the bar-code encodes the specific insulin type or the specific composition of insulin types.

4. The drug container of claim 1 where the circular bar code is on a carrying element located on the front face of the cartridge.

5. The drug container of claim 4, wherein the carrying element is a cap which is configured to be fitted over a front end of the drug container.

6. The drug container of claim 4, wherein the carrying element is a label which is configured to be adhered to the front face of the drug container.

7. The circular bar-code as included in claim 1, wherein the bar-code is configured such that the information encoded by the bar-code is readable along a circular line encircling the central point.

8. The circular bar-code as included in claim 1, wherein the bar-code is contained in a circular disc.

9. The circular bar-code as included in claim 1, wherein the bar-code is contained in a circular ring.

10. The circular bar-code as included in claim 9, wherein the bar-code is configured such that the information encoded by the bar-code is readable along every closed line which both runs within the circular ring and encircles the central point.

11. The circular bar-code as included in claim 1, wherein the bar-code comprises a plurality of bars running in a radial direction.

12. The circular bar-code as included in claim 11, wherein the information is encoded by the angular positions of the bars and the sizes of the angular ranges covered by the bars.

13. The circular bar-code as included in claim 1, comprising a reference mark which provides a point of reference for the angular positions of the bars.

\* \* \* \* \*